United States Patent [19]

Tawa et al.

[11] Patent Number: 5,786,911
[45] Date of Patent: Jul. 28, 1998

[54] OPTICAL SCANNING APPARATUS UTILIZING LINEAR POLARIZED BEAMS

[75] Inventors: Fumihiro Tawa; Junji Tomita; Shinya Hasegawa, all of Kawasaki, Japan

[73] Assignee: Fujitsu Limited, Kawasaki, Japan

[21] Appl. No.: 555,866

[22] Filed: Nov. 13, 1995

[30] Foreign Application Priority Data

Mar. 20, 1995 [JP] Japan ................... 7-061139

[51] Int. Cl.[6] ................... G02B 5/32; G02B 26/08
[52] U.S. Cl. ................... 359/17; 359/15; 359/209; 359/618
[58] Field of Search ................... 359/15, 17, 18, 359/204, 209, 215–219, 246, 249, 301, 484, 495, 500, 618; 347/233, 238, 241–244, 256, 257, 260

[56] References Cited

U.S. PATENT DOCUMENTS

| 4,597,640 | 7/1986 | Buhrer. | |
|---|---|---|---|
| 4,634,232 | 1/1987 | Tateoka. | |
| 4,766,303 | 8/1988 | Yoshizumi. | |
| 4,948,213 | 8/1990 | Hasegawa et al. | 359/18 |
| 5,272,550 | 12/1993 | Dickson et al. | 359/3 |
| 5,309,535 | 5/1994 | Bergano | 385/38 |
| 5,532,859 | 7/1996 | Guerin | 359/249 |

FOREIGN PATENT DOCUMENTS

| 63-26604 | 2/1988 | Japan | 359/495 |
|---|---|---|---|
| 5-45597 | 2/1993 | Japan | 359/204 |

Primary Examiner—Paul M. Dzierzynski
Assistant Examiner—Darren E. Schuberg
Attorney, Agent, or Firm—Nikaido, Marmelstein, Murray & Oram LLP

[57] ABSTRACT

An optical scanning apparatus is equipped with a light source for outputting a scanning beam having a single fixed direction polarization component. A polarization control element is provided for changing the polarization direction of the scanning beam outputted from the light source. An optical element is provided for splitting the scanning beam outputted from the polarization control element into two linearly polarized beams that orthogonally cross each other. An image formation element is utilized for forming images with the two linearly polarized beams outputted from the optical element at independent locations on a scanning surface. A signal processing device is provided for controlling the light source and the polarization control element, and for switching on and off the two linearly polarized beams.

1 Claim, 10 Drawing Sheets

OPTICAL SCANNING APPARATUS UTILIZING LINEAR POLARIZED BEAMS

BACKGROUND OF THE INVENTION

1. Field of the Invention

The present invention relates to an optical system scanning apparatus used within an apparatus that has printing functions, and is especially related to techniques to increase the number of scanning lines.

2. Description of the Related Art

Previously, printing apparatuses, copy machines, and facsimile apparatuses, etc., have been equipped with a scanning apparatus that uses a light such as a laser, etc.

Scanning apparatuses that use a laser are equipped with a laser oscillator as a light source. Furthermore, scanning apparatuses illuminate a photosensitive entity by passing the laser light outputted from the laser oscillator through a polygon mirror (a rotating, multi-sided mirror) and an fθ lens, etc. Here, the polygon mirror performs light deflection. The fθ lens changes equi-angular-velocity polarization to constant velocity spot scanning on the photosensitive surface. As a result of this, the laser light illuminated on the photosensitive surface forms spots. Then, the printing apparatus, the copy machine, or the facsimile apparatus, etc., uses the developing unit and the transcriber unit to print on the recording entity the spots that have been formed on the photosensitive surface.

Here, the scanning apparatus, performs a scan in a uniform direction (the main scanning direction) by rotating the photosensitive entity, and performs a scan in a uniform direction (the secondary scanning direction) perpendicular to the previously mentioned uniform direction by rotating the polygon mirror.

The rotation of the photosensitive surface, as well as the rotation of the polygon mirror, is performed mechanically with an electric motor, etc.

Incidentally, there has been a recent call for increased printing speed. As a result of these demands, the response has been to find methods for increasing the rotation speed of the photosensitive entity and the rotation speed of the polygon mirror. However, not only are there limits to the amount of speed increase with these methods, there are also the problems of increased costs related to the apparatus and a decrease in accuracy.

SUMMARY OF THE INVENTION

The present invention provides a technology for improving printing speed while preserving the current rotation speed of the main scanning direction and the secondary scanning direction, and its purpose is the improvement of printing accuracy and a reduction in the costs related to the apparatus.

In order to accomplish above purposes, this invention, detail of which is as follows, was made.

(1) The First Optical Scanning Apparatus

The first optical scanning apparatus has a light source, a polarization control element, an optical element, an image formation element and a signal processing means.

Furthermore, the signal processing means of the first optical scanning apparatus, in the case where two linear polarized beams are to be turned on, turns on the light source and simultaneously sets the polarization direction of the polarization control element to 45 degrees. At this time, the light source emits a scanning beam that is comprised of a single fixed direction polarization component. Then, the scanning beam outputted from the light source is inputted into the polarization control element. The polarization control element is an element that, when an electrical signal is inputted into it, according to the extent of this electrical signal, takes the inputted light, and changes the polarization direction for the output light. Then, the polarization control element that has been set at 45 degrees changes the scanning beam comprised of a single fixed direction polarization component into a scanning beam comprised of a bi-directional polarization component and outputs this polarized light. These two polarization components possess polarization directions that orthogonally cross each other. Then, the scanning beam outputted from the polarization control element is inputted into the optical element.

The optical element is an element for splitting the inputted scanning beam into two linear polarized beams that orthogonally cross each other, and it splits the scanning beam inputted from the polarization control element into two linearly polarization.

The two split linear polarized beams are inputted into the image formation element.

The image formation element causes the two linearly polarization inputted from the optical element to form images at independent locations on the photosensitive surface. As a result, two places on the photosensitive surface can be scanned simultaneously. Therefore, in the case where sentences, etc., are to be printed, two lines can be scanned simultaneously.

Here, the signal processing means, in the case where only one of the two linear polarized beams is to be turned on, turns on the light source and simultaneously sets the polarization direction of the polarization control element to 90 degrees. At this time, the scanning beam that is comprised of a single fixed direction polarization component that has been outputted from the light source is inputted into the polarization control element, where the polarization direction is rotated 90 degrees and outputted. Then, the scanning beam that has been outputted from the polarization control element is inputted into the optical element, and only a single linear polarized beam is outputted. The linear polarized beam that has been outputted from the optical element forms an image via the image formation element on the photosensitive surface. At this time, only one place on the photosensitive surface is scanned.

Furthermore, the signal processing means, in the case where only the other one of the two linear polarized beams is to be turned on, turns on the light source and simultaneously sets the polarization direction of the polarization control element to 0 degrees. At this time, the scanning beam that has been outputted from the light source is inputted into the polarization control element, and is outputted without changing the polarization direction from the polarization control element. Then, the scanning beam that has been outputted from the polarization control element is inputted into the optical element, and only a single linear polarized beams is outputted. The linear polarized beam that has been outputted from the optical element forms an image via the image formation element on the photosensitive surface. At this time, only one place on the photosensitive surface is scanned.

Also, the signal processing means, in the case where the two linear polarized beams are to be turned off, turns off the light source.

Moreover, the signal processing means and the printing apparatus may be connected with two signal lines. In the case when print commands are inputted from both signal lines, the signal processing means turns on the two linear polarized beams when a print command is inputted from only one signal line, it turns on only one linear polarized beam and when print stop commands are inputted from both signal lines, it turns off the light source.

Furthermore, in the case where a hologram is used as the optical element to differentiate the beam diameter of each linear polarized beams, two scans with different resolutions can be performed.

Next will be discussed an optical scanning apparatus equipped with a light control means instead of a polarization control element and a signal processing means.

The light control means, in the case where two linear polarized beams are to be turned on, together with turning on the light source, also sets the rotation angle of the light source to 45 degrees. As this time, the scanning beam that has been outputted from the light source that has been rotated 45 degrees is inputted into the optical element, where it is split into two orthogonally crossing linear polarized beams. Then, the two linearly polarization that have been outputted from the optical element are inputted into the image formation element, and form images at independent locations on the photosensitive surface. As a result, two places on the photosensitive surface can be scanned simultaneously.

Also, the light source control means, in the case where only one of the two linear polarized beams is to be turned on, together with turning on the light source, also sets the rotation angle of the light source to 90 degrees. At this time, the polarization component of the scanning beam to be outputted from the light source that has been rotated 90 degrees has its polarization direction rotated 90 degrees and is outputted. Then, the scanning beam that has been outputted from the light source is inputted into the optical element, and only a single linear polarized beams is outputted. The linear polarized beams that has been outputted from the optical element forms an image via the image formation element on the photosensitive surface. At this time, only one place on the photosensitive surface is scanned.

Furthermore, the light source control means, in the case where only the other one of the two linear polarized beam is to be turned on, together with turning on the light source also sets the rotation angle of the light source to 0 degrees. At this time, the scanning beam to be outputted from the light source is outputted from the light source without changing its polarization direction. And the scanning beam that has been outputted from the light source is inputted into the optical element. Here, since the scanning beam is comprised of only one fixed direction polarization component, the optical element outputs a single linearly polarization. The linear polarized beam that has been outputted from the optical element forms an image via the image formation element on the photosensitive surface. At this time, only one place on the photosensitive surface is scanned.

Also, the light source control means, in the case where the two linear polarized beam are to be turned off, turns off the light source.

Next will be discussed an optical scanning apparatus equipped with a polarizer and a polarizer control means instead of a polarization control element and a signal processing means.

The polarizer control means, in the case where two linear polarized beams are to be turned on, together with turning on the light source, also sets the rotation angle of the polarizer to 45 degrees. At this time, the scanning beam comprised of an irregular polarization component that has been outputted from the light source is inputted into the polarizer, and is outputted as a scanning beam comprised of two orthogonally crossing linear polarized beams from the polarizer. Then, the scanning beam that has been outputted from the polarizer is inputted into the optical element, where it is split into two linear polarized beams. Then, the two linear polarized beams enter into the image formation element, and form images at independent locations on the photosensitive surface. As a result, two places on the photosensitive surface can be scanned simultaneously.

Also, the polarizer control means, in the case where only one of the two linear polarized beams is to be turned on, together with turning on the light source, also sets the rotation angle of the light source to 90 degrees. Then, the scanning beam comprised of an irregular polarization component to be outputted from the light source is inputted into the polarizer, and is outputted as a scanning beam comprised of a single fixed direction polarization component from the polarization. The scanning beam that has been outputted from the polarizer is inputted into the optical element, and is outputted as a single linear polarized beam from the optical elemet. Then, the linear polarized beam that has been outputted from the optical element forms an image via the image formation element on the photosensitive surface. At this time, only one place on the photosensitive surface can be scanned.

Furthermore, the polarizer control means, in the case where only the other one of the two linear polarized beam is to be turned on, together with turning on the light source also sets the rotation angle of the polarizer to 0 degrees. Then, the scanning beam comprised of an irregular polarization component to be outputted from the light source is inputted into the polarizer, and is outputted as a scanning beam comprised of a single fixed direction polarization component from the polarizer. The scanning beam that has been outputted from the polarizer is inputted into the optical element, and is outputted as a single linear polarized beam from the optical elemet. Then, the linear polarized beam that has been outputted from the optical element forms an image via the image formation element on the photosensitive surface. At this time, only one place on the photosensitive surface can be scanned.

Also, the polarizer control means, in the case where the two linear polarized beams are to be turned off, turns off the light source.

(2) The Second Optical Scanning Apparatus

Next, the second optical scanning apparatus of the present invention is comprised of a first light source, a second light source, a polarization beam splitter, a hologram lens, and a hologram disk.

The first light source outputs a scanning beam comprised of a single fixed direction polarization component.

The second light source outputs a scanning beam comprised of a polarization component that orthogonally crosses the scanning beam of the first light source.

The first light source and the second light source are arranged so that the optical axis of the scanning beams orthogonally cross each other. Furthermore, a polarization beam splitter is placed at the location where the two scanning beams intersect. This polarization beam splitter synthesizes into a single scanning beam the scanning beam from the first light source and the scanning beam from the second light source, and outputs a scanning beam comprised of two orthogonally crossing polarization components.

The hologram lens diffracts the scanning beam outputted from the polarization beam splitter and inputs it into the hologram disk.

The hologram disk is a light element that splits the inputted scanning beam into two linear polarized beams, and that forms an image with these linear polarized beams on the photosensitive surface. This hologram disk may, for example, use an element that forms a hologram that deflects only one of the linearly polarization on the input side of the disk, and that forms a hologram on the output side that deflects only the other linear polarized beams.

The second optical scanning apparatus, in the case where two linear polarized beams are to be turned on, lights up the first light source and the second light source. At this time, the scanning beam outputted from the first light source and the scanning beam outputted from the second light source are inputted into the polarization beam splitter, and are synthesized into a single scanning beam. Here, since the scanning beam comprised of a single fixed direction polarization component to be outputted from the first light source and the scanning beam comprised of a single fixed direction polarization component to be outputted from the second light source have different polarization components, the scanning beam to be outputted from the polarization beam splitter becomes a scanning beam comprised of two polarization components that orthogonally cross each other. Then, the scanning beam outputted from the polarization beam splitter is diffracted with the hologram lens, and inputted into the hologram disk. The hologram on the input surface side of the hologram disk deflects only one linearly polarization, and the hologram on the output surface side deflects only the other linear polarized beam. Then, the hologram disk forms images with the deflected linear polarized beam at independent locations on the photosensitive surface. As a result, two places on the photosensitive surface can be scanned simultaneously.

The optical scanning apparatus, in the case where only one of the two linear polarized beams are to be turned on, turns on the first light source (or the second light source), and turns off the second light source (or the first light source). At this time, the scanning beam outputted from the first light source (or the second light source) is passed through the polarization beam splitter, or is reflected, and enters the hologram lens. At this time, the scanning beam that has been outputted from the polarization beam splitter continues to be a scanning beam comprised of a single fixed direction polarization component. The hologram lens diffracts the scanning beam, which is then inputted into the hologram disk. Then either the hologram on the input surface side or the hologram on the output surface side of the hologram disk deflects the scanning beam and forms an image with it on the photosensitive surface. As a result, only one place on the photosensitive surface can be scanned.

Also, the optical scanning apparatus, in the case where the two linear polarized beams are to be turned off, turns off the first light source and the second light source.

(3) The Third Optical Scanning Apparatus

The third optical scanning apparatus is comprised of a light source, a polarization control element, a hologram disk, a splitting and image formation means, and a signal processing means.

The light source outputs a scanning beam comprised of a single fixed direction polarized beam.

The polarization control element changes the polarization direction of the scanning beam according to electrical signals.

The hologram disk is a light element for refracting the scanning beam outputted form the polarization control element.

The splitting and image formation means splits the scanning beam outputted from the hologram disk into two linear polarized beams that orthogonally cross, and forms images with these linear polarized beams at two independent locations on the photosensitive surface.

The signal processing means switches the light source on and off, and, at the same time, switches the electrical signal for the polarization control element to supply or stop, and switches the two linear polarized beams on and off.

Here, the splitting and image formation means may not only straighten the scanning beam on the input surface side of a plate-style glass, at the same time, it may also form a hologram that forms an image of the two linear polarized beams it may also form a hologram that simultaneously diffracts one of the linear polarized beams at the output surface side, while simultaneously allowing the other linear polarized beams to pass through.

The signal processing means of the third optical scanning apparatus performs the same processing as previously described for the first optical scanning apparatus. Also, the hologram disk diffracts the scanning beam outputted from the light source and inputs it into the splitting and image formation means. The splitting and image formation means splits the inputted scanning beam into two linear polarized beams that orthogonally cross, and forms images with these at independent locations on the photosensitive surface. As a result, two places on the photosensitive surface can be simultaneously scanned.

In this way, with the optical scanning apparatus of the present invention, without increasing the speed of the motor that controls the main scanning direction, nor that of the motor that controls the secondary scanning direction, scanning speed can be improved, thus making it possible to reduce product costs and to improve printing accuracy.

DESCRIPTION OF THE PREFERRED EMBODIMENTS

Below, preferred embodiments of the present invention will be explained.

EMBODIMENT 1

Figure 1:
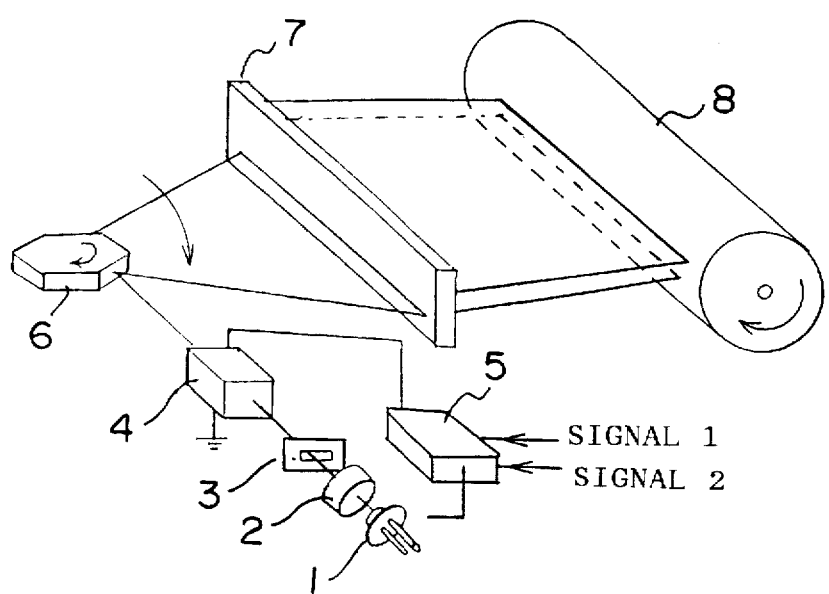
FIG. 1 is a configuration diagram of the optical scanning apparatus of preferred embodiment 1.

The configuration of the first preferred embodiment will be explained by referring to FIG. 1.

As shown within the diagram, the optical scanning apparatus is an apparatus for scanning the surface of the photosensitive drum 8 of a printing apparatus or a facsimile apparatus, etc., and is equipped with a semiconductor laser 1, a collimate lens 2, a mask 3, a polarization control element 4, a controller 5, a polygon mirror 6, and a long-plate lens 7. The collimate lens 2, the mask 3, the polarization control element 4, and the polygon mirror 6 are placed along the light axis of the semiconductor laser 1, while the input portion of the long-plate 7 is placed at a location that is orthogonal to the light axis.

The semiconductor laser 1, the collimate lens 2, and the mask 3 function as the light source of the present invention.

The semiconductor laser 1 outputs a scanning beam comprised of a single fixed direction linear polarized beam. The collimate lens 2 is located on the light axis of the scanning beam that is outputted from semiconductor laser 1; it makes the scanning beam a parallel light. The mask 3 is also located on the light axis of the scanning beam; it narrows the scanning beam outputted from the collimate lens.

The polarization control element 4 changes the polarization direction of the inputted light for the output light; it is a light element that changes the double refraction rate according to the voltage value supplied from the controller 5.

The controller 5 functions as the signal processing means of the present invention; based on the value (H or L) of the digital signals (signal 1, signal 2) inputted from an external source, it determines the amount of voltage that will be applied to the polarization control element 4. Moreover, the controller switches the semiconductor laser 1 on and off, and controls the turning on and off of the two scanning beams.

Here, the two digital signals are signals generated from within the apparatus; signal 1 is a signal for designating the scanning of the first line on the photosensitive surface, and signal 2 is a signal for designating the scanning of the second line of the photosensitive surface. For example, the optical scanning apparatus, when signal 1 and signal 2 are inputted as the designated signals, will simultaneously scan the first line and the second line. Also, the optical scanning apparatus, when only signal 1 is inputted as the designated signal, will only scan the first line. Also, the optical scanning apparatus, when only signal 2 is inputted as the designated signal, will only scan the second line. In the case where neither signal 1 or signal 2 are inputted as the designated signals, the optical scanning apparatus will turn off the semiconductor laser 1, and will neither scan the first line nor the second line.

The controller 5 also has the function of controlling the drive voltage of the semiconductor so that the light quantity of the scanning beam that will form an image on the photosensitive drum 8 will be a fixed quantity. A more detailed explanation of this controller 5 will be presented below.

The polygon mirror 6 scans the scanning beam, and inputs the scanning beam that has been outputted from the polarization control element 4 onto the input surface of the long-plate 7. This polygon mirror 6 is set so that it is capable of rotating, and as a result of its rotation, it is able to scan the input surface of long-plate 7 in a horizontal direction. The long-plate 7, according to the polarization component of the scanning beam inputted from the polygon mirror 6, will split the beam into two linear polarized beam, and form an image with each of the split linear polarized beams on the photosensitive drum 8.

Figure 2:
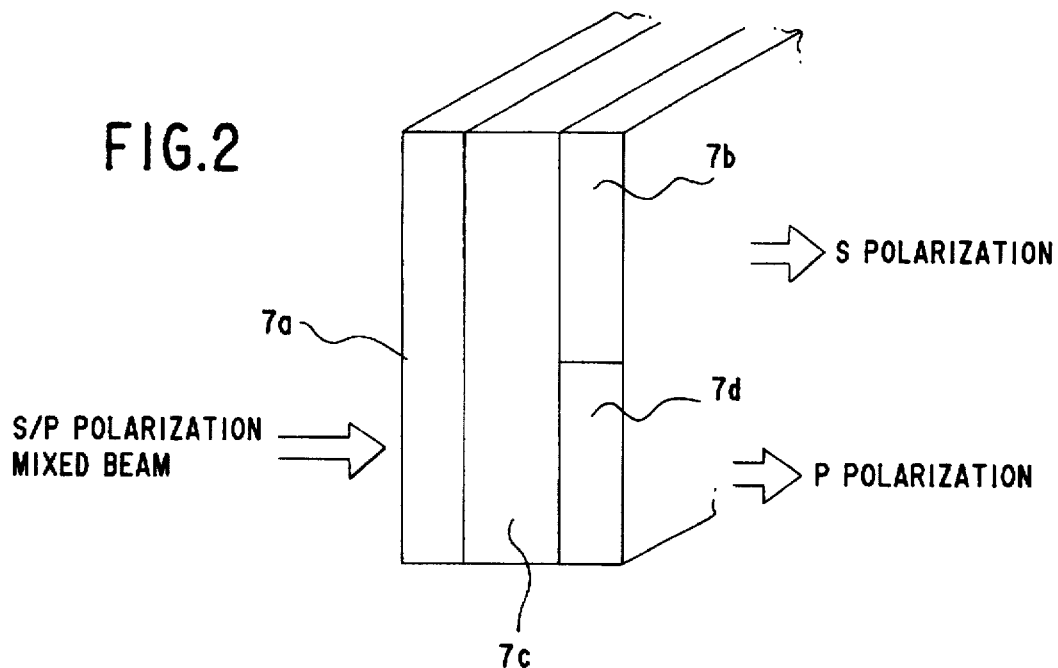
FIG. 2 is a configuration diagram of a long-plate glass.

FIG. 2 shows the configuration of the long-plate glass 7. The long-plate glass 7 forms the first hologram 7a on the input surface side of the plate-like glass material, and forms two different holograms (the second hologram 7b, and the third hologram 7d) on the top and bottom levels of the output surface side.

Figure 3:
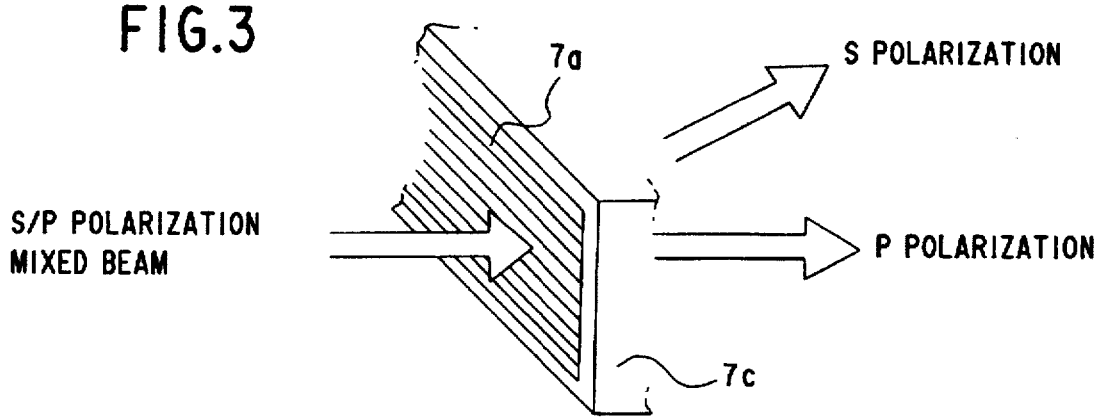
FIG. 3 is an image of the splitting of the scanning beam.

The first hologram 7a of the input surface side is a concrete example of an optical element of the present invention, and is a hologram that forms interference striations of a plane grating-shape. This first hologram 7a, as shown in FIG. 3, splits the scanning beam into a P polarization component and an S polarization component. In other words, the first hologram 7a allows P polarization to pass through, and diffracts S polarization in an upper direction.

Figure 4:
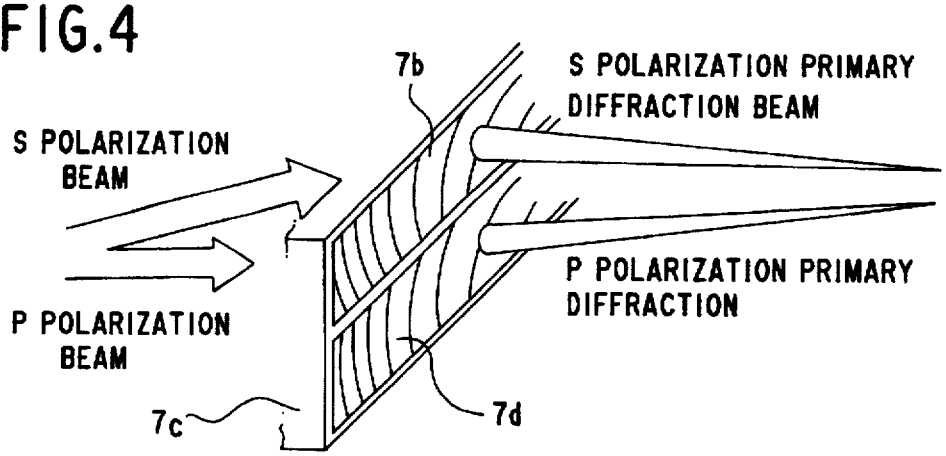
FIG. 4 is an image of image formation with the linear polarized beams.

The second hologram 7b and the third hologram 7d of the output surface side are concrete examples of the image formation element of the present invention. First, the second hologram 7b is comprised of non-spherical surface interference striations formed in the upper level of the output surface side. As shown in FIG. 4, it is a hologram that diffracts or narrows S polarization and forms an image with it on the photosensitive drum 8. Conversely, the third hologram 7d is comprised of non-spherical interference striations formed in the lower level of the output surface side. As shown in FIG. 3, it diffracts or narrows P polarization and forms an image with it on the photosensitive drum 8 at a different location from that of the above-mentioned S polarization.

Moreover, the thickness of the long-plate glass 7, in order to split the beam with differing polarization directions, is determined based on the spatial frequency of the first hologram 7a and the wavelength of the semiconductor laser. For example, when the spatial frequency of the first hologram 7a is taken as f, and the wavelength of the regenerated light is taken as $\lambda$, then the polarization splitting amount must fulfill the condition $f\lambda=1.4$. Furthermore, the second hologram 7b and the third hologram 7d are made to possess the same characteristics as an f$\theta$ lens. Also, the distance between the first hologram 7a and the second hologram 7b, and the interval between the first hologram 7a and the third hologram 7d is made to be an interval such that the interval between the scanning lines scanned by each mirror surface when the polygon mirror 6 has been rotated is equivalent to the gap between the locations of the two scanning beams on the photosensitive surface of the photosensitive drum 8.

Next, the controller 5 will be explained based on FIG. 5 and FIG. 6.

Figures 5A, 5B:
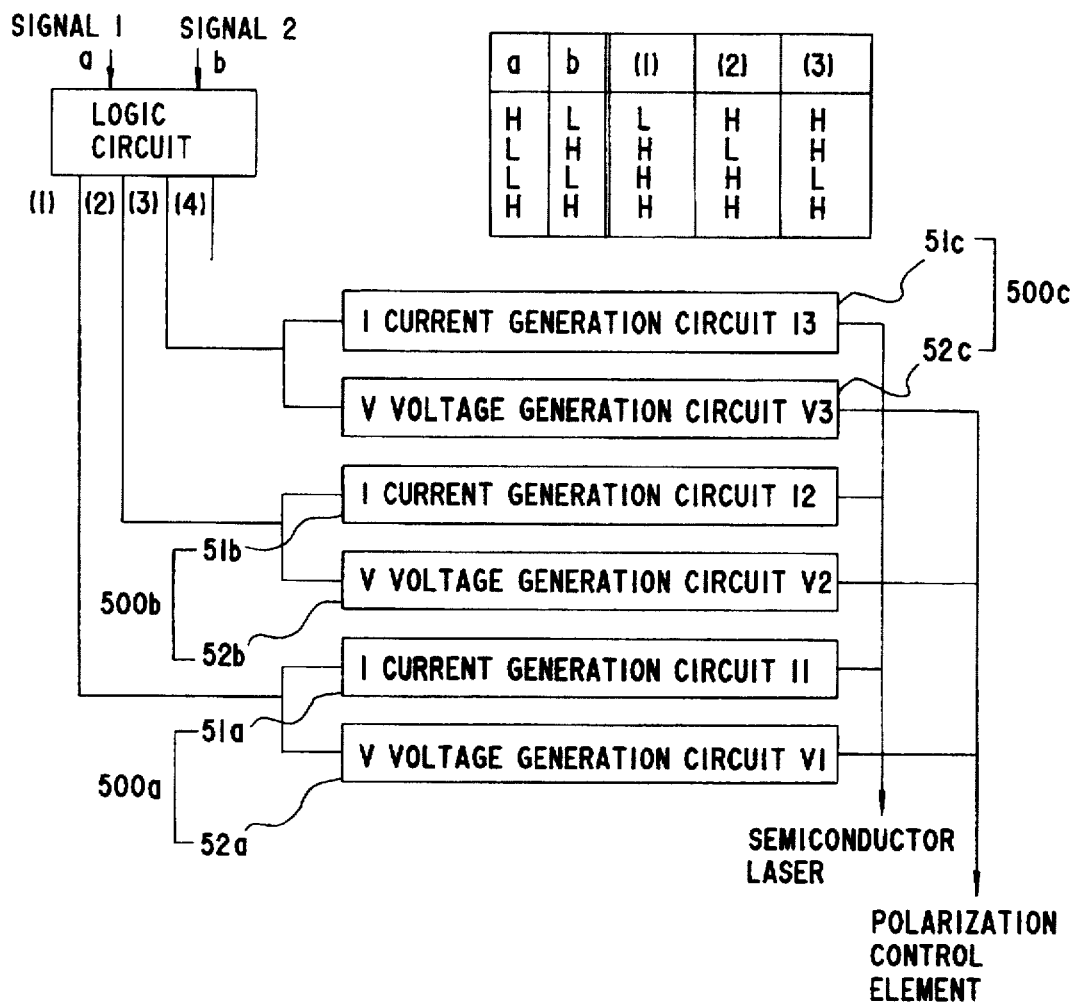
FIG. 5a is a configuration block diagram of the interior of the controller.
FIG. 5b is a diagram that shows the relationship between signals and the polarization control voltage.

FIG. 5(a) shows the internal configuration of the controller 5; FIG. 5(b) shows the relationship between the input signal and the polarization control voltage.

The controller 5, as shown in FIG. 5(a), is comprised so that a single logic circuit 50 is connected to three output circuits 500a, 500b, and 500c (below, abbreviated as output circuit 500).

Output circuit 500 is comprised of a current generation circuit 51 and a voltage generation circuit 52.

The current generation circuit 51 is a circuit for outputting the drive current for the semiconductor laser 1. Conversely, the voltage generation circuit 52 is a circuit for outputting drive voltage for the polarization control element 4. Moreover, the output current value and the output voltage value of the output circuit 500 are determined beforehand, and each of these values are made to be different.

The logic circuit 50 performs logic calculations according to the input values of signal 1 and signal 2, and determines instruction values for each of the output circuits 500. For example, as shown in FIG. 5(a) and FIG. 5(b), the logic circuit 50, when an "H" is inputted from signal 1 and an "L" is inputted from signal 2, outputs a start-up instruction "L" to output circuit 500a; it also outputs a stop command "H" to the other two output circuits, 500b and 500c. At this time, the current generation circuit 51a of output circuit 500b outputs a current value "$I_1$" for the semiconductor laser 1, and the voltage generation circuit 52a outputs a voltage value "$V_1$" for the polarization control element 4.

Also, the logic circuit 50, when an "L" is inputted from signal 1 and an "H" is inputted from signal 2, outputs a start-up instruction "L" to output circuit 500b; it also outputs a stop command "H" to the other two output circuits, 500a and 500c. At this time, the current generation circuit 51b of output circuit 500b outputs a current value "$I_2$" for the semiconductor laser 1, and the voltage generation circuit 52b outputs a voltage value "$V_2$" for the polarization control element 4.

Furthermore, the logic circuit 50, when an "H" is inputted from signal 1 and an "L" is inputted from signal 2, outputs a start-up instruction "L" to output circuit 500c; it also outputs a stop command "H" to the other two output circuits, 500a and 500b. At this time, the current generation circuit 51c of output circuit 500c outputs a current value "$I_3$" for the semiconductor laser 1, and the voltage generation circuit 52c outputs a voltage value "$V_3$" for the polarization control element 4.

Also, the logic circuit 50, when an "H" is inputted from signal 1 and an "H" is inputted from signal 2, outputs a stop instruction "H" to all of the output circuits 500. At this time, neither a current value nor a voltage value is outputted from any of the output circuits 500, and the semiconductor laser 1 is turned off.

Here, the voltage values $V_1$–$V_3$ outputted from the voltage generation circuits 51a–51c, and the current values $I_1$–$I_3$ outputted from the current generation circuits 52a–52c, respectively, will be explained by referring to FIG. 6.

Figure 6:
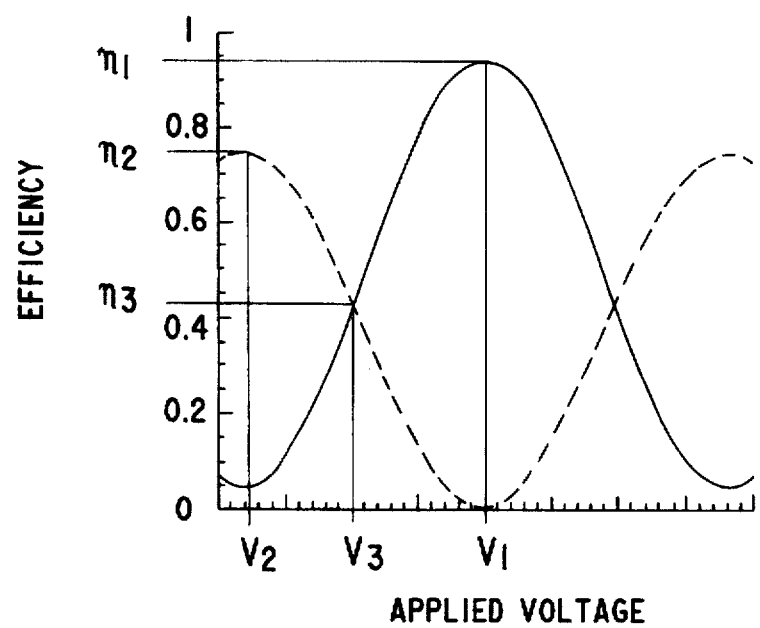
FIG. 6 is a diagram that shows the relationship between the applied voltage of the polarization control element and diffraction efficiency.

FIG. 6 is a diagram showing the relationship between the applied voltage of the polarization control element 4 and the diffraction efficiency. In the case where the applied voltage "$V_1$" is added to the polarization control element 4, the polarization rotation amount of the polarization control element 4 becomes "0 degrees", and the 0-level diffraction efficiency is the maximum value shown; simultaneously, the 1st-level (primary) diffraction efficiency shows the minimum value. In other words, of the two polarization components of the inputted light that orthogonally cross, only one of the polarization components will be outputted along the light axis.

Also, in the case where the applied voltage "$V_2$" is added to the previously mentioned polarization control element 4, the polarization rotation amount of the polarization control element 4 becomes "90 degrees", and the 0-level diffraction efficiency is the minimum value shown; simultaneously, the 1st-level (primary) diffraction efficiency shows the maximum value. In other words, of the two polarization components of the inputted light that orthogonally cross, only the other one of the polarization components will be outputted along the light axis.

Furthermore, in the case where the applied voltage "$V_3$" is added to the polarization control element 4, the polarization rotation amount of the polarization control element 4 becomes "45 degrees", and the 0-level diffraction efficiency and the first-level (primary) diffraction efficiency become roughly equal. In other words, the two polarization components of the inputted light that orthogonally cross will both be outputted along the light axis. At this time, the light quantity of the outputted light will be roughly half of the value compared with that for applied voltages "$V_1$" and "$V_2$". Here, in order to make the light quantity of the outputted light to show equivalent for each of the values of the applied voltages "$V_1$", "$V_2$", and "$V_3$", the conditions listed below must be fulfilled:

$$n_1 P_1 = n_2 P_2$$

$$2n_1 P_1 = n_3 P_3$$

$$P_1 = F(I_1)$$

$$P_2 = F(I_2)$$

$$P_3 = F(I_3)$$

(n: diffraction efficiency; P: the light output level for current value I)

The controller 5 of this preferred embodiment, in order to fulfill the above-listed conditions, determines the generation current for each of the current generation circuits 52a–52c. As a result, the light quantities of the lights outputted from the polarization control element 4 can be made to be roughly equivalent.

Below, the operation and effects of this preferred embodiment will be discussed.

With the optical scanning apparatus, when the logic circuit 50 of the controller 5 inputs an "L" from signal 1 and also inputs an "L" from signal 2, it outputs a start-up command "L" for output circuit 500c; it also outputs a stop command "H" for output circuits 500a and 500b.

At the output circuit 500c that has inputted a start-up command, the current generation circuit 51c supplies a current value "$I_3$" to the semiconductor laser 1, and the voltage generation circuit 52c applies a voltage "$V_3$" to the polarization control element 4.

At this time, the semiconductor laser 1, due to the drive current "$I_3$", will output a scanning beam with a light quantity of "$P_3$" (=F ($I_3$)).

Also, the polarization control element 4 will receive the applied voltage "$V_3$", and will put the polarization rotation amount at "45 degrees".

Then, the scanning beam comprised of a single fixed direction polarization component outputted from the semiconductor laser 1 will be inputted into the polarization control element 4, where its polarization component will be rotated 45 degrees. As a result, the scanning beam will become a mixed beam comprised of two orthogonally crossing polarization components (the S polarization component and the P polarization component). Then, the scanning beam outputted from the polarization control element 4 is scanned into the long-plate 7 via the polygon mirror 6. At the long-plate 7, the first hologram 7a will split the scanning beam into P polarization and S polarization, input the S polarization into the second hologram 7b, and input the P polarization into the third hologram 7d. The second hologram 7b diffracts the S polarization, and forms an image with it on the photosensitive surface of the photosensitive drum 8. Also, the third hologram 7d diffracts the P polarization and forms an image with it at a different location from the S polarization on the photosensitive drum 8.

As a result, in the case where a sentence, etc., is to be printed with the printing apparatus, two lines (rows or columns) may be scanned simultaneously.

Also, when the logic circuit 50 of the controller 5 inputs an "H" from signal 1 and inputs an "L" from signal 2, it outputs a start-up command "L" for output circuit 500a; it also outputs a stop command "H" for output circuits 500b and 500c.

At the output circuit 500a that has inputted a start-up command "L", the current generation circuit 51a supplies a current value "$I_1$" to the semiconductor laser 1, and the voltage generation circuit 52a applies a voltage "$V_1$" to the polarization control element 4.

At this time, the semiconductor laser 1, due to the drive current "$I_1$", will output a scanning beam with a light quantity of "$P_1$" (=F ($I_1$)).

Also, the polarization control element 4 will receive the applied voltage "$V_1$", and will put the polarization rotation amount at "0 degrees".

Then, the scanning beam comprised of a single fixed direction polarization component outputted from the semiconductor laser 1 will be inputted into the polarization control element 4. The polarization control element 4 will output the inputted scanning beam without rotating its polarization direction. For example, in the case where a scanning beam comprised of only an S polarization component is outputted from the semiconductor laser 1, the polarization control element 4 will output the S polarization component as an S polarization component. Conversely, in the case where a scanning beam comprised of only a P polarization component is outputted from the semiconductor laser 1, the polarization control element 4 will output the P polarization component as a P polarization component. Then, the scanning beam outputted from the polarization control element 4 is scanned into the long-plate 7 via the polygon mirror 6. At the long-plate 7, the first hologram 7a will input the scanning beam into the second hologram 7b or into the third hologram 7d. For example, in the case where the scanning beam is comprised only of a P polarization component, the first hologram 7a will input the scanning beam into the third hologram 7d. Also, in the case where the scanning beam is comprised only of an S polarization component, the first hologram 7a will input the scanning beam into the second hologram 7b. Then, either the second hologram 7b or the third hologram 7d diffracts the scanning beam and form an image with it on the photosensitive surface of the photosensitive drum 8.

As a result, in the case where a sentence, etc., is to be printed with the printing apparatus, only one line (a row or a column) may be printed.

Next, when the logic circuit 50 of the controller 5 inputs an "L" from signal 1 and inputs an "H" from signal 2, it outputs a start-up command "L" for output circuit 500b; it also outputs a stop command "H" for output circuits 500a and 500c.

At the output circuit 500b that has inputted a start-up command "L", the current generation circuit 51b supplies a current value "$I_2$" to the semiconductor laser 1, and the voltage generation circuit 52b applies a voltage "$V_2$" to the polarization control element 4.

At this time, the semiconductor laser 1, due to the drive current "$I_2$", will output a scanning beam with a light quantity of "$P_2$" (=F ($I_2$)).

Also, the polarization control element 4 will receive the applied voltage "$V_2$", and will set the polarization rotation amount at "90 degrees".

Then, the scanning beam outputted from the semiconductor laser 1 will be inputted into the polarization control element 4, which will rotate the polarization direction 90 degrees and output the beam. For example, in the case where a scanning beam comprised of an S polarization component is outputted from the semiconductor laser 1, the polarization control element 4 will change the S polarization component into a P polarization component, and output it. Conversely, in the case where a scanning beam comprised of a P polarization component is outputted from the semiconductor laser 1, the polarization control element 4 will change the P polarization component into an S polarization component, and output it. Then, the scanning beam outputted from the polarization control element 4 is scanned into the long-plate 7 via the polygon mirror 6. At the long-plate 7, the first hologram 7a will input the scanning beam into the second hologram 7b or into the third hologram 7d. For example, in the case where the scanning beam is comprised only of a P polarization component, the first hologram 7a will input the scanning beam into the third hologram 7d. Also, in the case where the scanning beam is comprised only of an S polarization component, the first hologram 7a will input the scanning beam into the second hologram 7b. Then, either the second hologram 7b or the third hologram 7d diffracts the scanning beam and form an image with it on the photosensitive surface of the photosensitive drum 8.

As a result, in the case where a sentence, etc., is to be printed with the printing apparatus, only one line (a row or a column) may be printed.

Also, when the logic circuit 50 of the controller 5 inputs an "H" from signal 1 and inputs an "H" from signal 2, it outputs a stop command "H" for all of the output circuits 500a, 500b and 500c. As a result, the semiconductor laser 1 no longer inputs a drive current from any of the output circuits 500, and is turned off. At this time, beam scanning is not performed on the photosensitive surface.

In the above manner, with the present preferred embodiment, two different places on the photosensitive surface may be scanned simultaneously. For example, in the case where sentences, etc., are to be printed, two rows (or two columns) may be scanned simultaneously. Therefore, without increasing the rotation speed of the polygon mirror 6 or the rotation speed of the photosensitive drum 8, printing speed can be increased.

Moreover, in the present preferred embodiment, the beam diameter of the beam that the second hologram 7b uses for image formation, and the beam diameter of the beam that the third hologram 7d uses for image formation have been dealt with as having equivalent diameters. However, if the two beam diameters are made to differ, and also if the polarization control element 4 is used only as the polarization direction switching means, by controlling the polarization control element 4, the resolution of the printing data may be changed at will.

Figure 7:
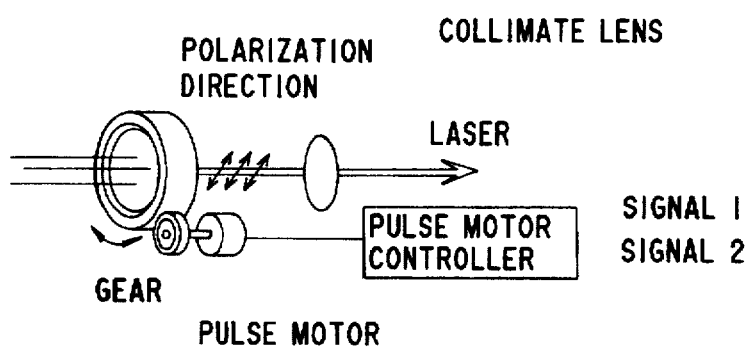
FIG. 7 is another concrete example of a scanning beam generation section. (1)

Also, in the present preferred embodiment, the polarization control element 4 and the controller 5 are used to turn on and to turn off the two linear polarized beams. However, as shown in FIG. 7, by using the light axis at the semiconductor laser as the axis, and by rotating the semiconductor laser, the polarization component of the scanning beam can be changed, and here the switching on and off of the two linear polarized beams can be performed. This configuration may be configured with an LD holder that forms a gear on its cylindrical external surface and is attached to the semiconductor laser, a pulse motor with its motor axis attached to a gear that meshes with this LD holder gear, and a pulse motor controller that controls pulse amounts supplied to this pulse motor and that controls the amount of rotation of the semiconductor laser. The pulse motor controller functions as the light source control means of the present invention; it is connected to signal 1 and signal 2. The rotation angle of the semiconductor laser 1 is determined according to the values of these signals. For example, if an "H" signal is inputted into signal 1, and an "H" signal is inputted into signal 2, the pulse motor controller outputs a pulse signal amount that turns the rotation angle of the pulse motor "45 degrees". At this time, the scanning beam outputted from the semiconductor laser is a mixed beam comprised of a P polarization component and an S polarization component, and two lines (rows or columns) can be scanned on the photosensitive surface.

Also, if an "L" signal is inputted into signal 1, and an "H" signal is inputted into signal 2, the pulse motor controller outputs a pulse signal amount that turns the rotation angle of the pulse motor "90 degrees". At this time, the scanning beam outputted from the semiconductor laser is comprised of a beam with either a P polarization component or an S polarization component, and only one place can be scanned on the photosensitive surface.

Furthermore, if an "H" signal is inputted into signal 1, and an "L" signal is inputted into signal 2, the pulse motor controller outputs a pulse signal amount that turns the rotation angle of the pulse motor "0 degrees". At this time, the scanning beam outputted from the semiconductor laser is comprised of a beam with either an S polarization component or a P polarization component, and only one place can be scanned on the photosensitive surface.

Figure 8:
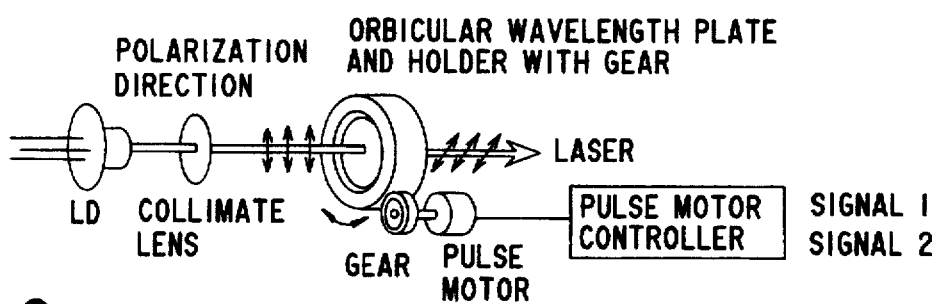
FIG. 8 is another concrete example of a scanning beam generation section. (2)

Also, as a means for controlling the turning on and off the two linear polarized beams, as shown in FIG. 8, a scanning beam may be outputted from a random polarization laser and inputted into a polarizer. By rotating this polarizer, the polarization component of the scanning beam can be changed, and the two linear polarized beams can be switched on and off. This configuration may be configured with a polarizer holder that forms a gear on its cylindrical external surface and is attached to the orbicular-shaped polarizer, a pulse motor with its motor axis attached to a gear that meshes with this LD holder, and a pulse motor controller that controls pulse amounts supplied to this pulse motor, and that controls the amount of rotation of the semiconductor laser. The pulse motor controller functions as the polarizer control means of the present invention; it determines the rotation angle of the polarizer according to the values of signal 1 and signal 2. For example, if an "H" signal is inputted into signal 1, and an "H" signal is inputted into signal 2, the pulse motor controller outputs a pulse signal amount that turns the rotation angle of the pulse motor "45 degrees". At this time, the scanning beam that passes through the polarizer becomes a mixed beam comprised of a P polarization component and an S polarization component, and two lines (rows or columns) can be scanned simultaneously on the photosensitive surface.

Also, in the case where an "L" signal is inputted into signal 1, and an "H" signal is inputted into signal 2, the pulse motor controller outputs a pulse signal amount that turns the rotation angle of the pulse motor "90 degrees". At this time, the scanning beam that passes through the polarizer becomes a beam with only a P polarization component or a beam with only an S polarization component, and only one place can be scanned on the photosensitive surface.

Furthermore, if an "H" signal is inputted into signal 1, and an "L" signal is inputted into signal 2, the pulse motor controller outputs a pulse signal amount that turns the rotation angle of the pulse motor "0 degrees". At this time, the scanning beam that passes through the polarizer becomes a beam with only an S polarization component or a beam with only a P polarization component, and only one place can be scanned on the photosensitive surface.

Figure 9:
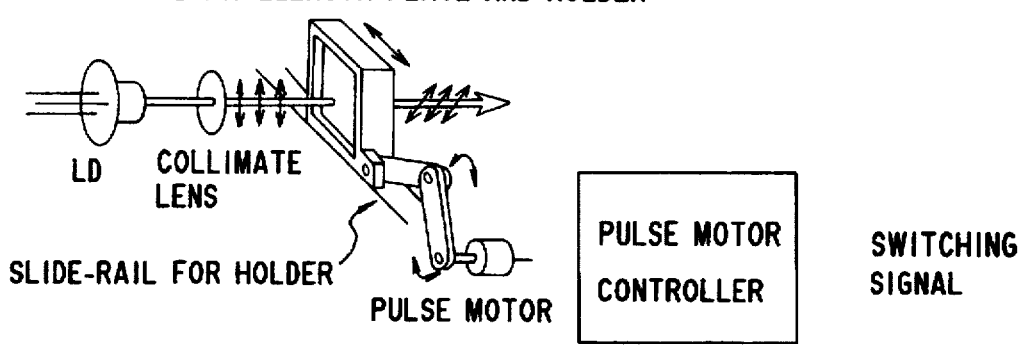
FIG. 9 is another concrete example of a scanning beam generation section. (3)

Furthermore, in the case where an apparatus that can change the resolution is to be used, as shown in FIG. 9, this may be configured with a semiconductor laser, a collimate lens, a mask, a wavelength plate, and a wavelength plate mover mechanism. The wavelength plate mover mechanism may be comprised with a slide-rail that is perpendicular to the light axis, a slidable wavelength plate that rides this slide-rail, a pulse motor that slides the wavelength plate, an arm mechanism that transforms the rotation movement of the pulse motor into rectilinear movement and thereby slides the wavelength plate, and a pulse controller that controls the pulse amounts that must be supplied to the pulse motor. In the case where the resolution is to be changed with this mechanism, the wavelength plate is inserted and removed from the path of the light axis.

EMBODIMENT 2

The second preferred embodiment of the present invention will be explained by referring to FIG. 10 and FIG. 11.

Figure 10:
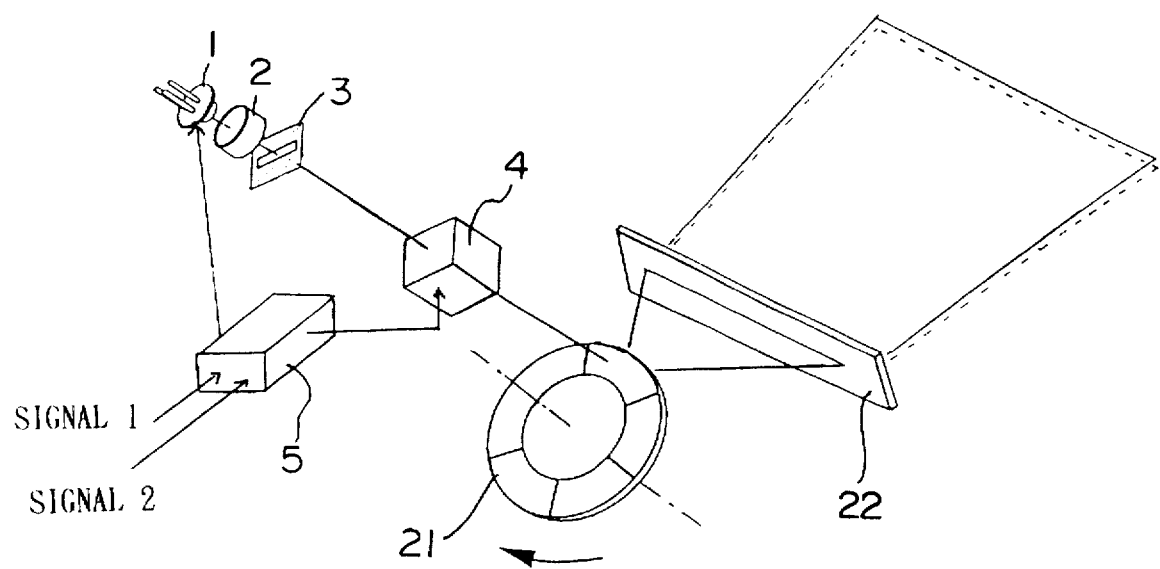
FIG. 10 is a configuration diagram of the optical scanning apparatus of preferred embodiment 2.

FIG. 10 is a configuration diagram of the optical scanning apparatus. Here, the polygon mirror 6 of the previously described Embodiment 1 is replaced with a hologram disk 21, and, at the same time, it is also equipped with a long-plate glass 22 that has different characteristics than the long-plate glass 7.

The hologram disk 21 is diffracted in a manner unrelated to the polarization component of the scanning beam; through its own rotation, it scans the scanning beam onto the long-plate glass 22.

Figure 11:
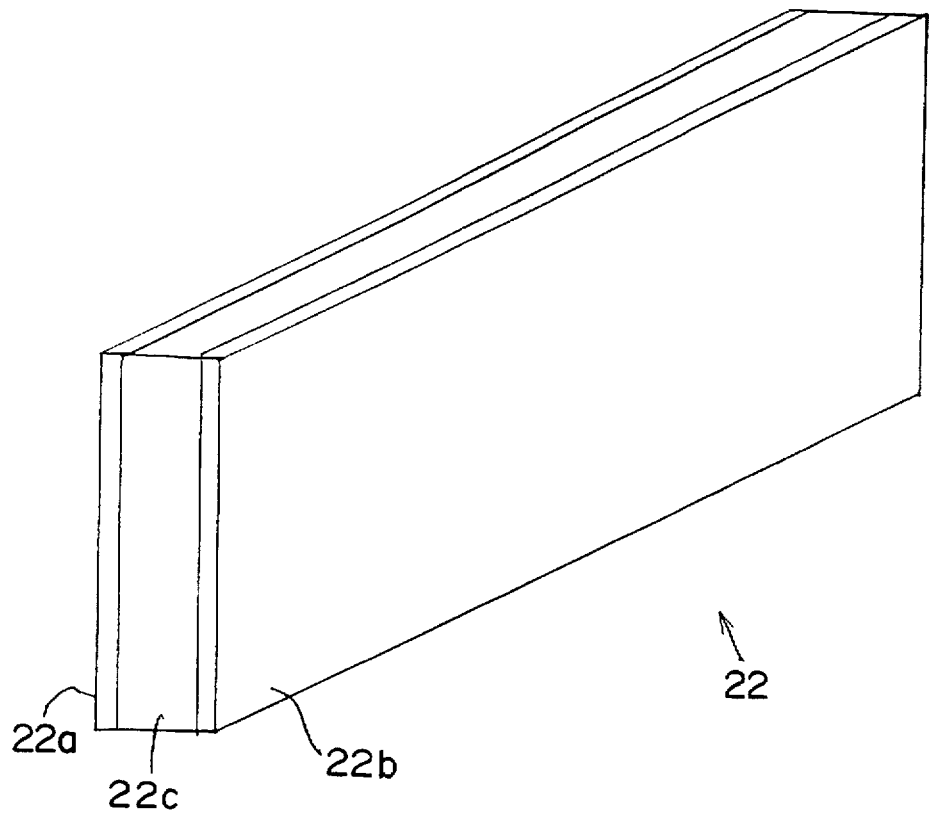
FIG. 11 is a concrete example of a long-plate glass.

The long-plate glass 22, as shown in FIG. 11, is a light element that forms the fourth hologram 22a on the input surface side of the plate-shaped glass 22c, and that forms the fifth hologram 22b on the output surface side.

The fourth hologram 22a straightens the inputted scanning beam regardless of the polarization component of the scanning beam; it is a hologram comprised of non-spherically shaped interference striations to narrow the beam when it is scanned onto the image formation surface.

The fifth hologram 22b is comprised of plane grating interference striations that diffract P polarization components and allow S polarization components to pass through. Moreover, the fifth hologram 22b is made such that it has no impact on the beam diffractions of the fourth hologram.

As a result, in the case where a mixed beam containing S polarization and P polarization is inputted, the apparatus splits the S polarization and the P polarization into two beams, and can form images with each of these polarizations at different locations on the photosensitive surface.

Moreover, since the control procedures whereby the controller 5 controls the polarization control element 4 and the semiconductor laser 1 are the same as those explained in the previously mentioned Embodiment 1, they will not be discussed again here.

With this type of configuration, the same effects as those obtained with the previously mentioned Embodiment 1 are also obtainable.

EMBODIMENT 3

The third embodiment of the present invention will be explained by referring to FIG. 12 and FIG. 13.

Figure 12:
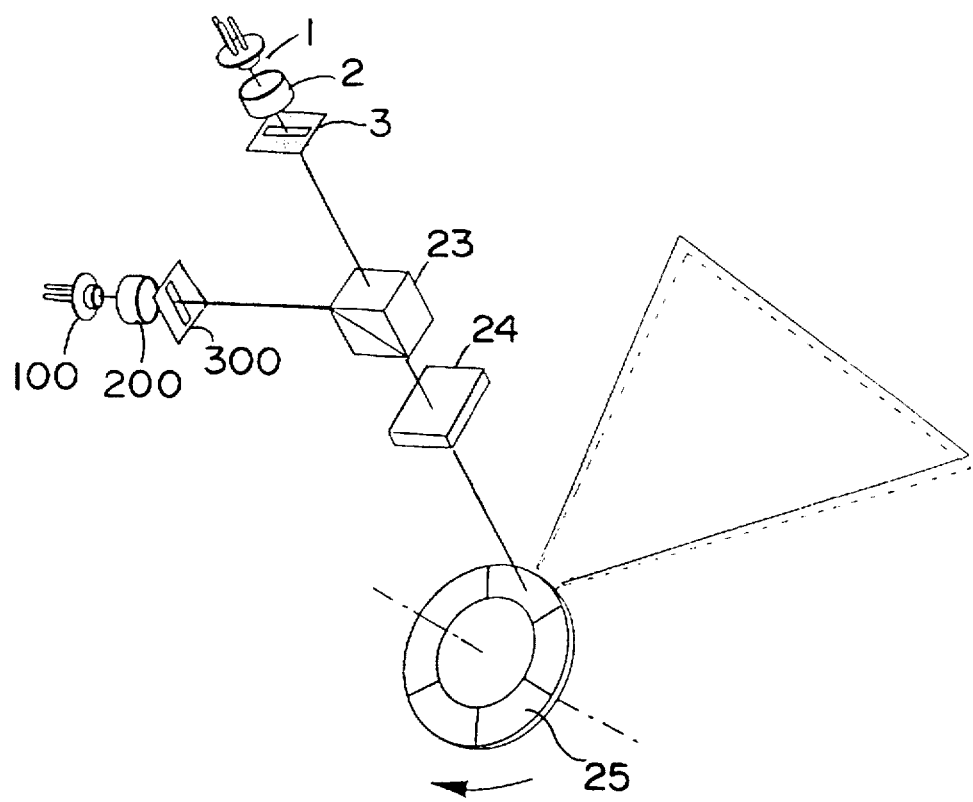
FIG. 12 is a configuration diagram of the optical scanning apparatus of preferred embodiment 3.

FIG. 12 is a configuration diagram of the optical scanning apparatus. Within the diagram, the optical spanning apparatus is equipped with two semiconductor lasers 1/100 whose light axes orthogonally cross each other. At the location where these two semiconductor lasers 1/100 intersect, a polarization beam splitter 23 is placed. Furthermore, between each of the semiconductor lasers 1/100 and the polarization beam splitter 23 is a collimate lens 2/200 and a mask 3/300.

The polarization beam splitter synthesizes two scanning beams with different polarization components, and outputs these as a single scanning beam. Moreover, a hologram lens 24 and a hologram disk 25 are placed along the light axis path of the scanning beam.

The hologram lens 24 is a lens formed of a hologram that diffracts the beam on the plate-shaped glass surface regardless of the polarization direction of the beam.

Figure 13:
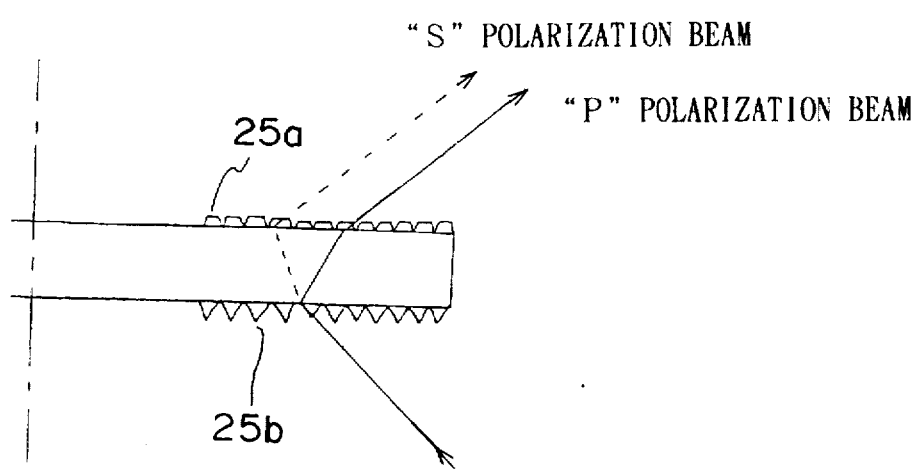
FIG. 13 is a cross-sectional diagram of the hologram disk.

The hologram disk 25, as shown in FIG. 13, has the sixth hologram 25a that deflects only S polarized beams and is formed on the input surface side of the freely rotating disk 25c; it also has the seventh hologram 25b that deflects only P polarized beams and is formed on the output surface side. Here, the thickness of the disk 25c (in other words, the interval between the sixth hologram 25a and the second hologram 25b) is congruent to the gap between the beam light axes of the P polarization and the S polarization; according to this gap, images are formed on the photosensitive surface, and two scanning lines can be obtained with the same facet. The thickness of the disk 25c at this time is made at a thickness such that the gap between the location of the two scanning lines on the image formation surface is equivalent to the interval between the location of the lines scanned with the next facet.

Below, the operation and effects of the present preferred embodiment will be discussed.

With the optical scanning apparatus of the present preferred embodiment, in the case where two linear polarized beams are to be turned on, the two semiconductor lasers 1/100 are turned on. At this time, the scanning beams outputted from each scanning laser 1/100 pass through the collimate lenses 2/200 and the masks 3/300 and are inputted into the polarization beam splitter 23. At this time, one of the two scanning beams is a beam comprised only of a P polarization component, while the other scanning beam is a beam comprised only of an S polarization component. The polarization beam splitter 23 synthesizes the two inputted scanning beams into a single scanning beam, and outputs it. At this time, the scanning beam that has been outputted from the polarized beam splitter 23 is a mixed beam comprised of P polarization and S polarization. Furthermore, the scanning beam outputted from the polarized beam splitter 23 is refracted with hologram lens 24 and is inputted into the hologram disk 25. The sixth hologram 25a of the input surface side of the hologram disk 25 passes the scanning beam with the P polarization through, and deflects only the S polarization. The seventh hologram 25b on the output surface side of the hologram disk 25 deflects the scanning beam with the P polarization, and lets the S polarization pass through. Furthermore, through the self-rotation of the hologram disk 25, the S polarization and the P polarization are made to form images at independent locations on the photosensitive surface.

In this way, two different places on the photosensitive surface can be operated simultaneously.

Next, with the optical scanning apparatus, in the case where only either one of the two scanning beams is to be turned on, only semiconductor laser 1 (or 100) of the two semiconductor lasers is turned on. At this time, the scanning beam outputted from semiconductor laser 1 (or 100) passes through (or is reflected by) the polarization beam splitter, and is inputted into the hologram lens. At this time, the scanning beam is a beam comprised only of a single fixed direction polarization component. The hologram lens 24 diffracts the scanning beam and inputs it into the hologram disk 25. Either the sixth hologram 25a of the input surface side of the hologram disk 25, or the seventh hologram 25b of the output surface side of the hologram disk deflects the scanning beam, and forms an image with it on the photosensitive surface. As a result, only one place on the photosensitive surface can be scanned.

Also, the optical scanning apparatus, in the case where both of the scanning beams are to be turned off, turns off the two semiconductor lasers 1/100 to their original state.

In this way, even if the type of configuration of the present third preferred embodiment is employed, the same effects as previously described for Preferred Embodiment 1 can be obtained.

Figure 14:
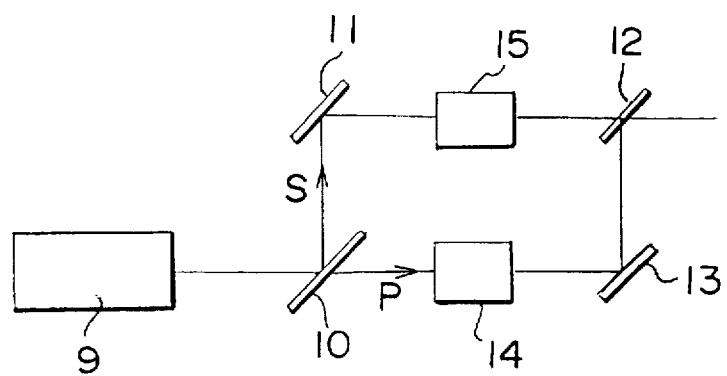
FIG. 14 is another concrete example of a light source.

The light source shown in FIG. 14 may be used instead of the light sources (semiconductor lasers, random polarization laser) explained in Preferred Embodiments 1–3.

This light source splits the scanning beam outputted from the random polarization laser 9 with the polarization beam splitter 10 into S polarization and P polarization. Then, the S polarization that has been split with the polarization beam splitter 10 is inputted into the audio-optical element (AOM) 15 via the mirror 11. Conversely, the P polarization that has been split with the polarization beam splitter 10 is inputted into the audio-optical element (AOM) 14. Here, according to external signals, the two audio-optical elements (AOM) 14/15 switch between either passing through the inputted beams or intercepting them.

The S polarization that has passed through the audio-optical element (AOM) 15 is inputted into the polarization beam splitter 12. Also, the P polarization that has passed through the audio-optical element (AOM) 14 is inputted into the polarization beam splitter 12 via the mirror 13.

The polarization beam splitter 12 synthesizes the inputted S polarization and P polarization.

In the case where the audio-optical element (AOM) 14 (or 15) has interrupted the beam through an external signal, the scanning beam that is comprised only of an S polarization component (or the scanning beam that is comprised only of a P polarization component) is outputted from the polarization beam splitter 12.

What is claimed is:

1. An optical scanning apparatus comprising:
   a light source for outputting a scanning beam comprised of a single fixed direction polarization component;
   a polarization control element for changing, according to an electrical signal, a polarization direction of the scanning beam outputted from said light source;
   a hologram disk for diffracting the scanning beam outputted from said polarization control element;
   a splitting image formation means including a first hologram on an input surface side of a plate-shaped glass for straightening said scanning beam, and a second hologram on an output surface side of the plate shaped glass for splitting said straightened scanning beam into two linear polarized beams having polarization states that orthogonally cross each other by diffracting one of the linear polarized beams and simultaneously passing through the other linear polarized beam, to form images with the linear polarized beams at independent locations on a scanning surface; and
   a signal processing means for turning on and off said light source, for switching to "supply" or "stop" the electrical signal for said polarization control element, and for switching on and off each of said linear polarized beams.

* * * * *